United States Patent
Ji et al.

(10) Patent No.: US 9,479,307 B2
(45) Date of Patent: Oct. 25, 2016

(54) METHOD AND APPARATUS FOR USER-SPECIFIC REFERENCE SIGNALING ALLOCATION OF CONTROL CHANNEL IN WIRELESS COMMUNICATION SYSTEMS

(75) Inventors: Hyoungju Ji, Seoul (KR); Cheng Shan, Gyeonggi-do (KR); Younsun Kim, Gyeonggi-do (KR); Joonyoung Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 322 days.

(21) Appl. No.: 13/459,920

(22) Filed: Apr. 30, 2012

(65) Prior Publication Data

US 2012/0275406 A1    Nov. 1, 2012

Related U.S. Application Data

(60) Provisional application No. 61/480,819, filed on Apr. 29, 2011.

(51) Int. Cl.
*H04L 5/00* (2006.01)
*H04W 72/04* (2009.01)

(52) U.S. Cl.
CPC ........... *H04L 5/0051* (2013.01); *H04L 5/0037* (2013.01); *H04L 5/0053* (2013.01); *H04W 72/048* (2013.01); *H04L 5/0023* (2013.01); *H04L 5/0048* (2013.01); *H04W 72/042* (2013.01)

(58) Field of Classification Search
CPC .......................................... H04L 5/0051–5/57
See application file for complete search history.

(56) References Cited

U.S. PATENT DOCUMENTS

| | | | |
|---|---|---|---|
| 2011/0064159 A1 | 3/2011 | Ko et al. | |
| 2011/0110296 A1* | 5/2011 | Malladi et al. | 370/328 |
| 2011/0237283 A1* | 9/2011 | Shan et al. | 455/509 |
| 2011/0244873 A1 | 10/2011 | Lee et al. | |
| 2011/0249633 A1* | 10/2011 | Hong et al. | 370/329 |
| 2012/0207099 A1* | 8/2012 | Lindh | H04L 5/0057 370/329 |
| 2013/0208648 A1* | 8/2013 | Huang et al. | 370/315 |
| 2014/0044070 A1* | 2/2014 | Chen et al. | 370/329 |

FOREIGN PATENT DOCUMENTS

| | | |
|---|---|---|
| KR | 1020100069558 | 6/2010 |
| KR | 1020110029063 | 3/2011 |

OTHER PUBLICATIONS

3rd Generation Partnership Project; Technical Specification Group Radio Access Network; Evolved Universal Terrestrial Radio Access (E-UTRA); Physical Layer Procedures (Release 10), 3GPP TS 36.213 V10.1.0, Mar. 2011.

\* cited by examiner

*Primary Examiner* — Marcus R Smith
(74) *Attorney, Agent, or Firm* — The Farrell Law Firm, P.C.

(57) ABSTRACT

A new structure of user-specific reference signals design is provided. Higher spectrum efficiency is achieved, and two users may share the same resource for control signal transmission in a distributed antenna system via different distributed antennas. In addition, search space overlapping is enabled and thus control resource reuse is made possible.

20 Claims, 11 Drawing Sheets

UE Procedures eNB Procedures

UE Procedures

METHOD AND APPARATUS FOR USER-SPECIFIC REFERENCE SIGNALING ALLOCATION OF CONTROL CHANNEL IN WIRELESS COMMUNICATION SYSTEMS

PRIORITY

This application claims priority under 35 U.S.C. §119(e) to U.S. Provisional Application No. 61/480,819 filed in the U.S. Patent and Trademark Office on Apr. 29, 2011, the contents of which are incorporated herein by reference.

BACKGROUND OF THE INVENTION

1. Field of the Invention

The present invention relates generally to a wireless cellular communication system, more particularly, to an Orthogonal Frequency Division Multiple Access (OFDMA) wireless communication system, where one or more Orthogonal Frequency Division Multiplexing (OFDM) symbols are allocated as a control channel to convey control information.

2. Description of the Related Art

The control channel is designed to carry the control signaling including Download Control Information (DCI) for purposes of downlink and uplink resource allocation. The design of the control channel may vary from system to system. In $3^{rd}$ Generation Partnership Project Long Term Evolution (3GPP LTE) Release 8, the Physical Downlink Control CHannel (PDCCH) consists of the first several OFDM symbols of each sub-frame.

In 3GPP LTE Release 8, a Packet Data Control CHannel (PDCCH) is presented in the first several OFDM symbols. The number of OFDM symbols used for PDCCH is indicated in another physical control format indication channel (PCFICH) in the first OFDM symbol. Each PDCCH consists of L Control Channel Elements (CCE), where L=1, 2, 4, 8 representing different CCE aggregation levels; each CCE consists of 9 Resource Element Group (REG) spreading on the transmission bandwidth. Each REG consists of 4 consecutive resource elements exclusive of common reference resource elements. The PDCCH structure is illustrated in FIG. 1.

Upon receiving the PDCCH, the user should try blindly decoding PDCCH on its search space. Search space contains multiple possible CCE starting index and CCE aggregation level. The user try to decode expected DCI format with the assumption, if the CRC check passes, the user will assume a DCI format is successfully received.

In 3GPP LTE release 8 to 10, the search space is designed by the following Equation (1):

$$L=\{(Y_k+m)\bmod \lfloor N_{CCE,k}/L\rfloor\}+i \quad (1)$$

where,
i=0, . . . , L−1,
m=0, . . . , $M^{(L)}$−1,
$Y_k=(A\cdot Y_{k-1})\bmod D$, $Y_{-1}=n_{RNTI}\neq 0$, A=39827, D=65537,
and $M^{(L)}$ is defined in the following Table 1:

TABLE 1

| | PDCCH candidates monitored by a User Equipment (UE) | | |
|---|---|---|---|
| | Search space $S_k^{(L)}$ | | Number of PDCCH |
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In the legacy 3GPP systems the PDCCH is transmitted using transmit diversity when multiple antennas are available. The user uses the common reference signals inside the PDCCH region for decoding. The common reference signals are cell-specific.

However, by using the cell-specific common reference signal, a user has to decode every DCI format until CRC check passes. As such, the process for decoding can be considered very inefficient.

SUMMARY OF THE INVENTION

Aspects of the present invention are to address the above-mentioned problems and/or disadvantages and to provide at least the advantages described below. Accordingly, an aspect of the present invention is to provide a method of user-specific reference signaling allocation of control channel at an Evolved Node B (eNB), including receiving a channel information, determining whether to transmit a Physical Download Control Channel (PDCCH) including user-specific reference signal based on the channel information, allocating, if a transmission of PDCCH including user-specific reference signal is determined, the user-specific reference signal to a resource element, wherein the resource element is predefined according to UE information, and transmitting the PDCCH including user-specific reference signal.

An aspect of the present invention provides a method of user-specific reference signaling allocation of control channel at a UE, including receiving a PDCCH, determining whether the PDCCH includes a user-specific reference signal, and decoding, if the PDCCH includes a user-specific reference signal, a resource element including the user-specific reference signal, wherein the resource element is predefined according to UE information.

In accordance with an aspect of the present invention, an apparatus for user-specific reference signaling allocation of control channel at a eNB includes a transceiver which transmits and receives data, and a controller which controls receiving a channel information, determining whether to transmit a PDCCH including user-specific reference signal based on the channel information, allocating, if a transmission of PDCCH including user-specific reference signal is determined, the user-specific reference signal to a resource element, wherein the resource element is predefined according to UE information, and transmitting the PDCCH including user-specific reference signal.

In accordance with an aspect of the present invention, provided is an apparatus for user-specific reference signaling allocation of control channel at a UE, the apparatus including a transceiver which transmits and receives data, and a controller which controls receiving a PDCCH, determines whether the PDCCH includes a user-specific reference signal, and decodes, if the PDCCH includes a user-specific reference signal, a resource element including the user-specific reference signal, wherein the resource element is predefined according to UE information.

BRIEF DESCRIPTION OF THE DRAWINGS

The above and other aspects, features, and advantages of embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE INVENTION

Figure 1:
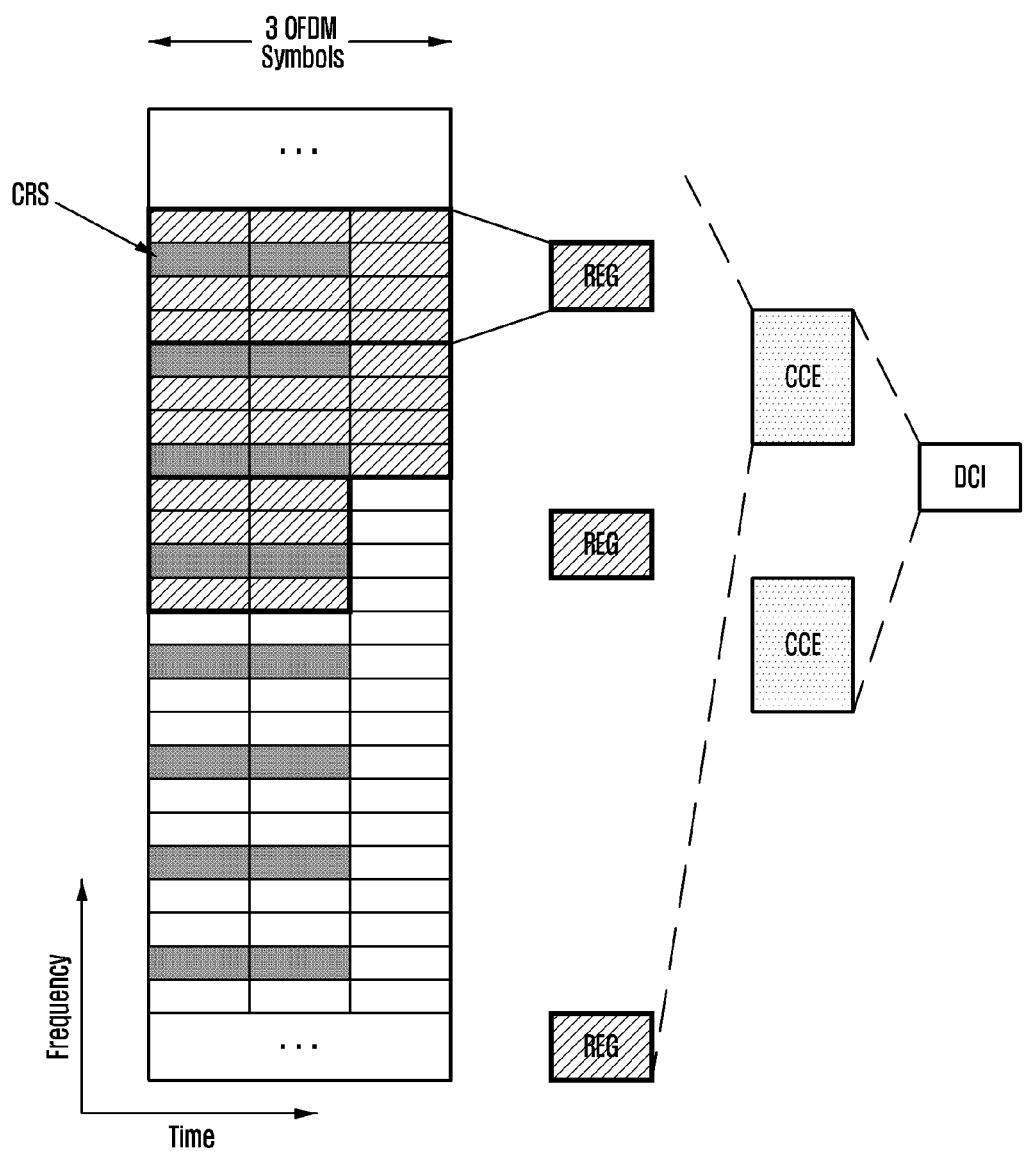
FIG. 1 illustrates the PDCCH structure in a 3GPP LTE system.

Embodiments of the present invention are described in detail with reference to the accompanying drawings. The same reference numbers are used throughout the drawings to refer to the same or like parts. Detailed description of well-known functions and structures incorporated herein may be omitted for the sake of clarity and conciseness.

The terms and words used in the following description and claims are not limited to their dictionary meanings, but are merely used by the inventor to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

Throughout the present description, the 3GPP LTE Release 8-10 is regarded as the legacy system and the present invention can be implemented in the in-development Release 11 and beyond systems, and also may be applied to other cellular systems such as IEEE 802.16 (WiMax).

It is an objective of the present invention to provide methods for users to receive PDCCH DCI format using user-specific reference signals.

To achieve this objective, a plurality of resource elements in the PDCCH region are allocated as user-specific reference signals. In order to maintain backward compatibility, the resource elements occupied by the newly allocated user-specific reference signals are different from those occupied by the common reference signals. The common reference signals remain present in the PDCCH region for measurement and legacy user support purposes.

The structures of CCE and REG, which are the basis of the legacy PDCCH, are maintained. Since the 9 REGs are nearly uniformly distributed on the bandwidth, it is preferable for the user-specific reference signals to be per REG based.

In an embodiment, one out of the four Resource Elements (REs) in a REG is allocated as user-specific RS. The designated RE is transmitted using the same precoding as the PDCCH data carried by the remaining REs within the REG.

During the initial access phase, the system should assume legacy PDCCH transmission using the common reference signal. The user should feedback the channel information as configured by the eNB, which will decide the transmission mode for both control and data information toward the UE. If PDCCH transmission mode is decided as using the user-specific RS, the eNB should configure the UE to a user-specific RS based decoding mode before actual transmission.

It is another objective of the present invention to provide methods for two users communicating with two remote radio heads that are far apart enough to reuse the same frequency and time resource for control channel transmission.

To achieve this objective, new reuse identification is introduced to the system so that those UEs that perform resource sharing will be assigned with the same reuse identification. The system will generate the search spaces for control channels based on the reuse identifications instead of user identifications, so that those UEs with the same reuse Identification (ID) will have identical search spaces and the resource reuse is thus possible.

Two embodiments of the present invention will now be described.

Demodulation Reference Signal (DM-RS) Design for Control Channel

The control channel structure in the disclosed system follows the same philosophy as in 3GPP LTE release 8 to 10. For N resource elements in an OFDM symbol, common reference signals are first allocated. The location of the common reference signals depends on the antenna number and cell ID of the system. The remaining REs are then grouped into REGs, where each REG contains four consecutive REs. Nine distributed REGs are then grouped into a CCE, which is the resource allocation granularity for PDCCH DCI format transmission.

In an embodiment, one out of the four consecutive REs in a REG is allocated as a user-specific RS. The designated RE is transmitted using the same precoding as the PDCCH data carried by the remaining REs within the REG.

Figure 2:
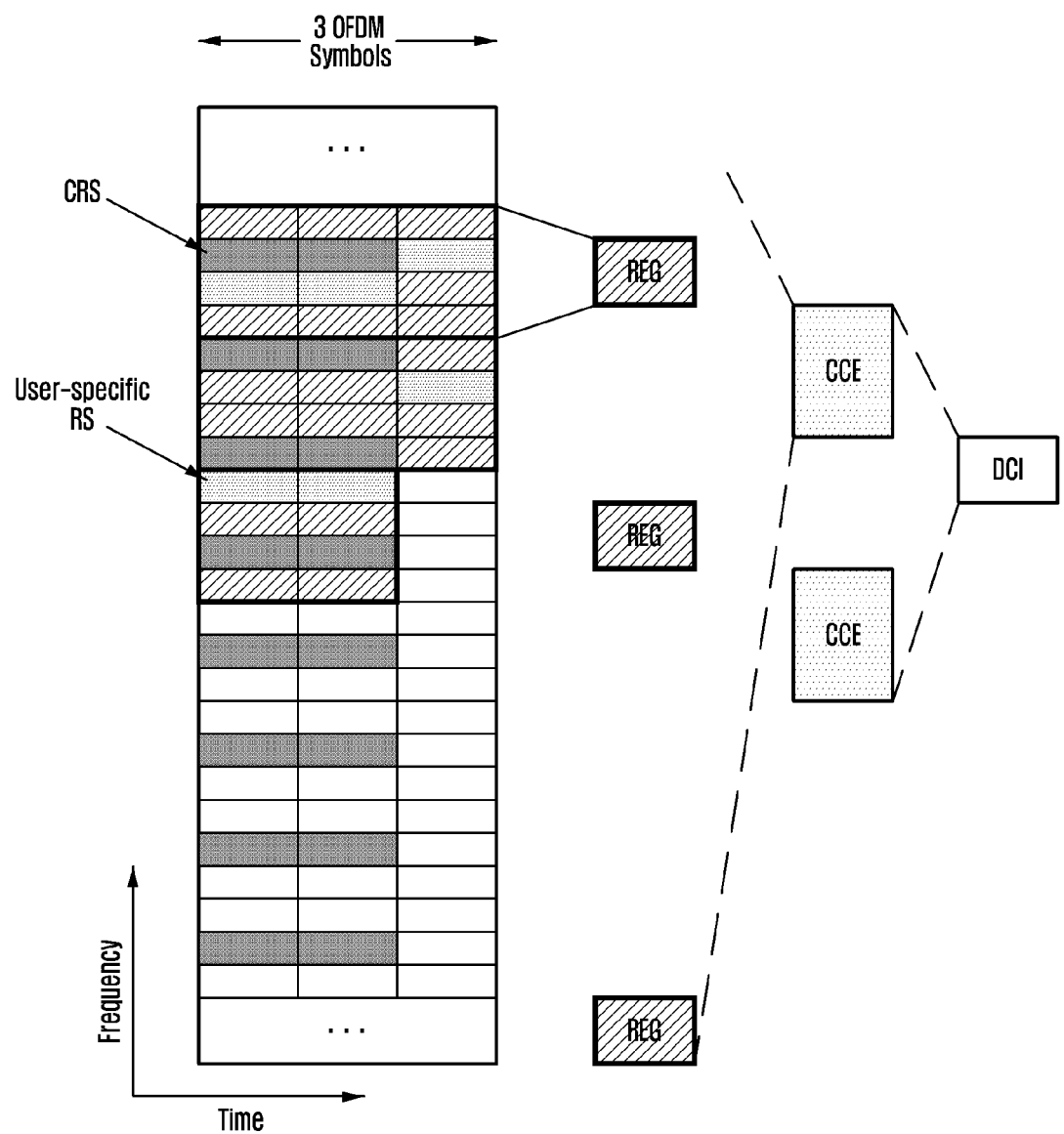
FIG. 2 illustrates the disclosed PDCCH structure with one user-specific Reference Signal (RS) in a REG, according to the present invention.
Figure 3:
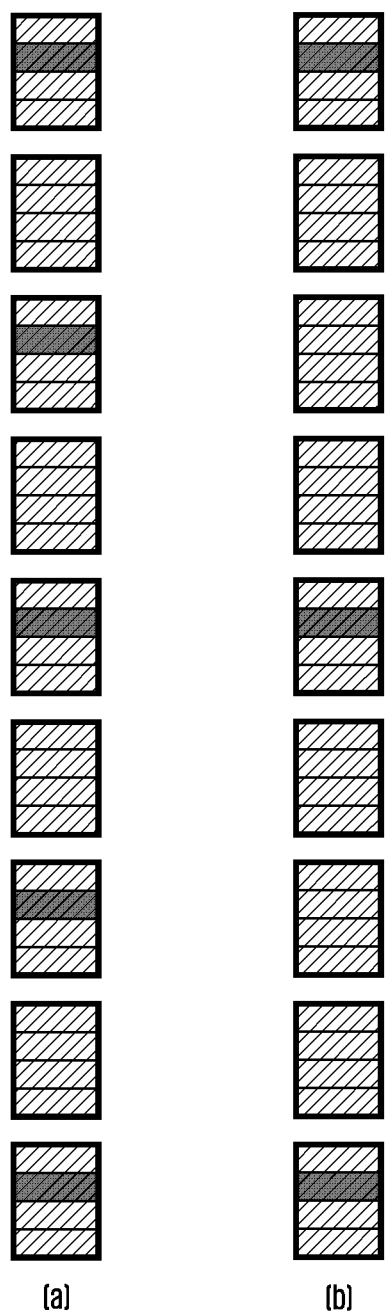
FIG. 3 illustrates disclosed PDCCH structure with 5 and 3 user-specific RSs per CCE, according to the present invention.

As shown in FIG. 2, one RE in a REG is selected as a user-specific RS. The position of user-specific RS can be either fixed, e.g., the second RE within a REG as shown in FIG. 2, or user-specific. For user-specific allocation, the index of the RE for user-specific RS can be a function of user ID, e.g., $I_{RS}$=UEID mod 4, where $I_{RS}$=0~3 is the RS position index within a REG.

In another embodiment, for the nine REGs within a CCE, only a few selected REGs are allocated with user-specific RS. As illustrated in FIG. 3a and FIG. 3b, 5 and 3 REGs out of one CCE are allocated with user-specific RS, respectively. This type of sparse RS allocation is suitable for frequency-flat channel conditions.

In a system in which the present invention is to be implemented, the RS density can either be fixed or configured in advance. For dense user-specific RS distribution with one user-specific RS per REG, the UE will use the user-specific RS for channel estimation of the REG where the RS is located. For sparse user-specific RS distribution with one user-specific RS every several REGs, the UE will use frequency domain interpolation for channel estimation of those REGs where no RS is located.

Figure 4:
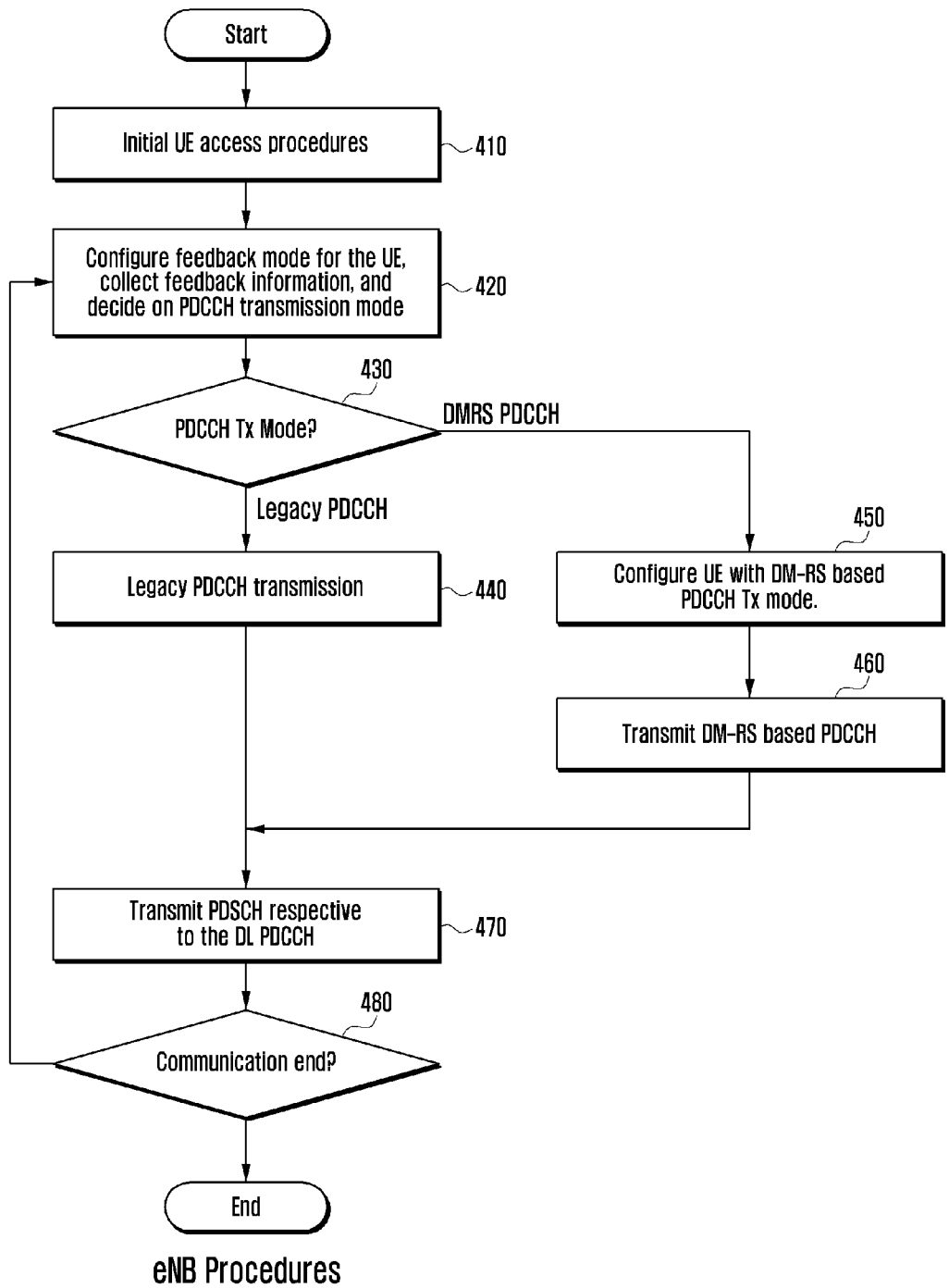
FIG. 4 illustrates a working procedure for a user-specific RS-based PDCCH transmission at eNB, according to the present invention.
Figure 5:
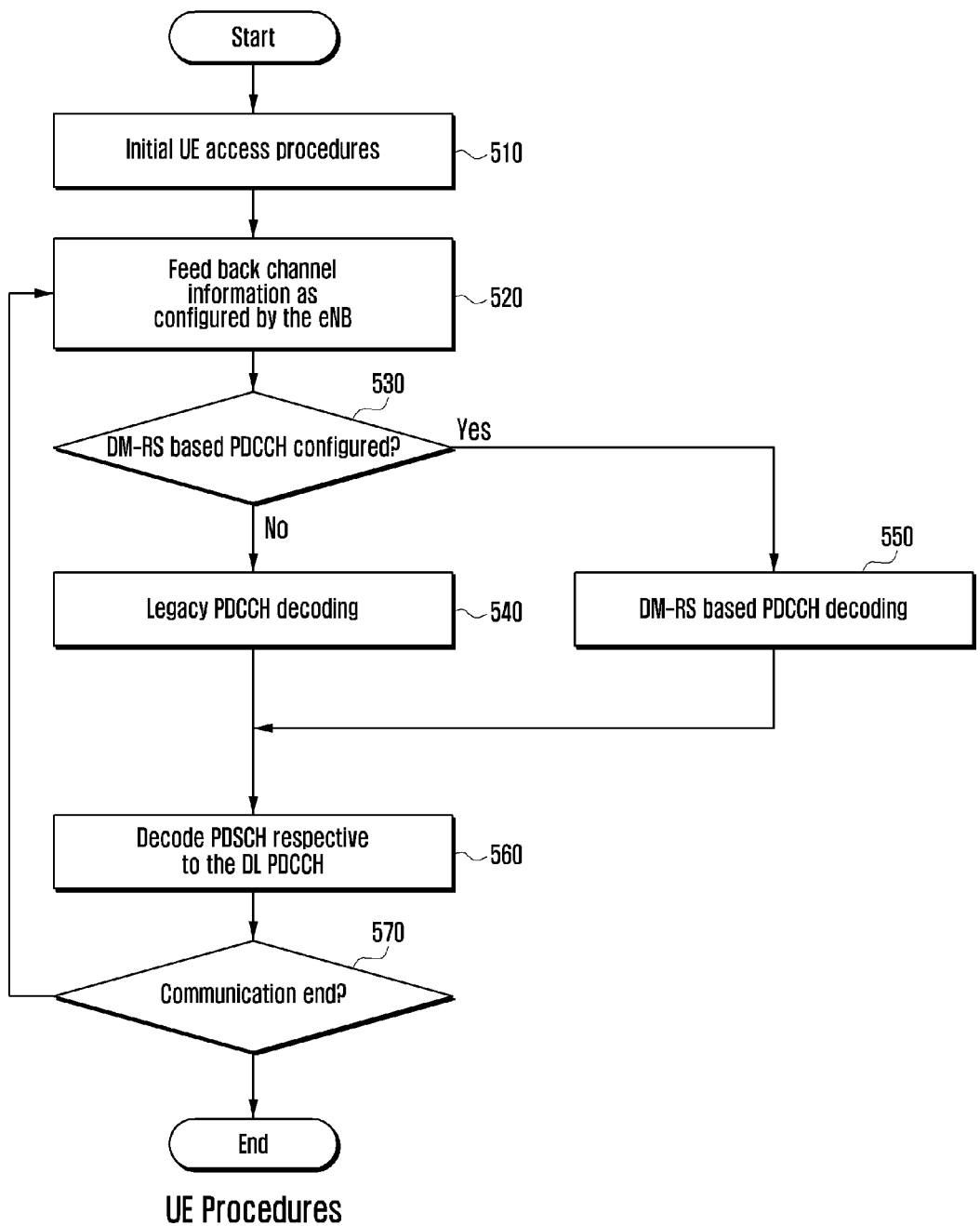
FIG. 5 illustrates a working procedure for user-specific RS-based PDCCH transmission at a UE, according to the present invention.

The working procedure for user-specific RS based PDCCH transmission according to the present invention is illustrated in FIG. 4 and FIG. 5.

FIG. 4 illustrates working procedure for user-specific RS based PDCCH transmission at eNB.

At step 410, the controller performs initial UE access procedures. During the initial access phase, the eNB should configure any control information that is conveyed by PDCCH in a legacy transmission mode. At step 420, the controller configures and collects the channel feedback from the UE, determines the proper transmission mode and properties for the PDSCH. At step 430, the controller determines the PDCCH transmission mode and properties. Specifically, if it is found that using a DMRS-based PDCCH mode, which is disclosed in the present invention, will significantly improve the PDCCH performance and thus reduce the necessary size of a DCI format, the controller will configure the UE with the DM-RS based PDCCH transmission and transmit the necessary configuration signaling before actual PDCCH transmission at step 450. Then, the controller proceeds to step 460 and transmits the DM-RS based PDCCH to the UE in the legacy PDCCH region. The search space and blind decoding rules of the legacy system still apply for backward compatibility.

If the legacy PDCCH transmission is determined, the controller proceeds to step 440 and perform legacy PDCCH transmission.

At step 470, the controller transmits Physical Download Shared Channel respective to the PDCCH. Then the controller proceeds to step 480 and determines whether communication has ended. If communication has not ended, the controller returns to step 420. If communication has ended, the controller ends the procedure.

FIG. 5 illustrates the working procedure for user-specific RS based PDCCH transmission at a UE.

At step 510, the controller performs initial UE access procedures. The accessing UE should assume the legacy PDCCH transmission mode before new configuration is performed by the eNB. Then, at step 520, the controller feeds back channel information as configured by the eNB.

At step 530, the controller determines whether a Demodulation Reference Signal (DM-RS) based PDCCH is configured. If the DM-RS based PDCCH is configured, the UE starts PDCCH blind decoding assuming DM-RS based PDCCH transmission at step 550. Within the search spaces, the UE will use the DM-RS as predefined for PDCCH blind decoding. Each REG will carry three data symbols as well as one DM-RS symbol.

If the DM-RS based PDCCH is not configured, the UE begins legacy PDCCH decoding at step 540. After successful PDCCH decoding, the controller continues decoding the traffic payload as indicated by the PDCCH at step 560. The procedure is the same as that in the legacy system. Then the controller proceeds to step 570 and determines whether communication has ended. If communication has not ended, the controller returns to step 520. If communication has ended, the controller ends the procedure.

Search Space Design for Distributed Antenna Systems

Figure 6:
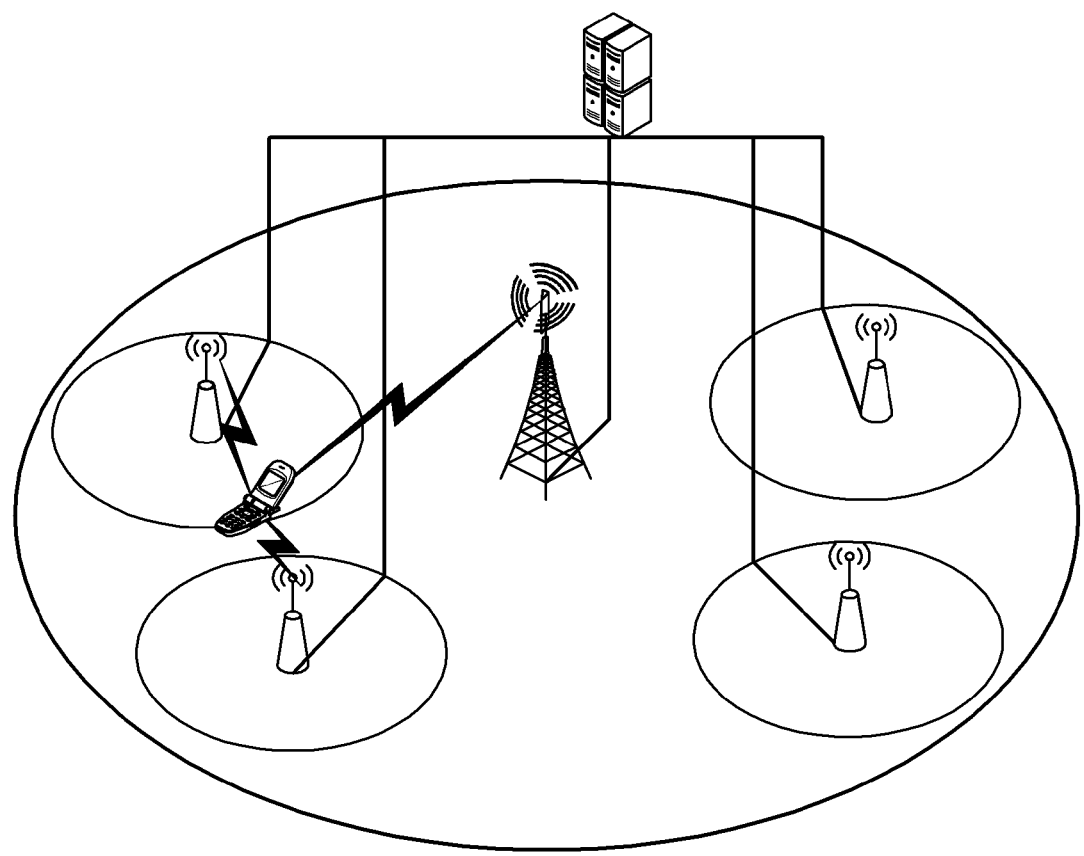
FIG. 6 illustrates a deployment scenario of a distributed antenna system, according to the present invention.

In another embodiment, the wireless system may employ additional multiple RRHs within the cell coverage. The RRHs are connected with a central controller via high-speed low-delay links. The central controller can be located with the legacy eNB, or separately from the eNB with a high speed low-delay link with one or more eNBs and their attached RRHs, as shown in FIG. 6. Comparing to the legacy antennas deployed at the eNB, the additional RRHs usually transmit at low power.

Figure 7:
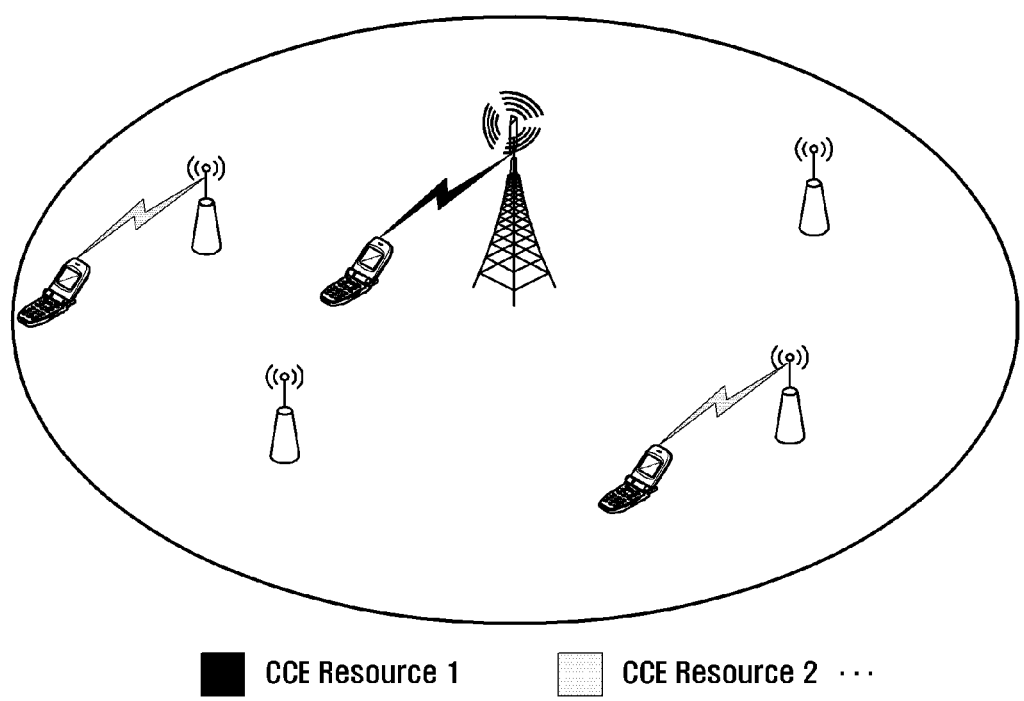
FIG. 7 illustrates a scenario in which two UEs are communicating via two remote Remote Radio Heads (RRHs), according to the present invention.

In the described Distributed Antenna Systems (DASs), it is possible for two remote RRHs to share the same time-frequency resources given that they are far apart enough so that no significant mutual interference will be incurred. A scenario is illustrated in FIG. 7, in which two UEs are communicating via two remote RRHs, respectively. The two RRHs are able to reuse the same frequency-time OFDMA resources for communication since they will not tend to interfere with each other.

However, the PDCCH resources are defined as the search spaces for the PDCCH resource reuse. According to the search space-partitioning rule in 3GPP LTE specification release 8 to 10, the locations of search spaces for UEs are randomized according to their user IDs. For two UEs attached with two difference RRHs to reuse the same PDCCH resources, it would be much more preferable if the search space of the two UEs overlap with each other, so that the eNB can schedule their PDCCH using the same resources. Nevertheless, reusing the legacy search space-partitioning rule will not tend to have such a feature, and thus will make the resource reuse almost impossible.

To allow two different UEs to have the same search space, the search space generation rule should be modified so that IDs of the UEs do not cause confusion. In the present invention, a reuse identification, or Radio Unit-Radio Network Temporary Identifiers (RU-RNTI) is introduced. This RU-RNTI is configured via higher layer RRC signaling. When the RU-RNTI is not configured, the UE should assume no resource reuse is turned on, and legacy rules should apply. If a RU-RNTI value is configured, the UE will use the assigned RU-RNTI for related UE specific DCI format decoding. The search space generation rule is modified by Equation (2) as follows:

$$L=\{(Y_k+m) \bmod \lfloor N_{CCE,k}/L \rfloor\}+i \qquad (2)$$

where, $Y_k=(A \cdot Y_{k-1}) \bmod D$, $Y_{-1}=n_{RU-RNTI} \neq 0$, A=39827, D=65537, and the definition of $M^{(L)}$ is the same as that in legacy system.

With overlapped search space, the eNB is able to schedule the same resource for two UEs from two distributed RRHs, respectively, without causing significant mutual interference.

Figure 8:
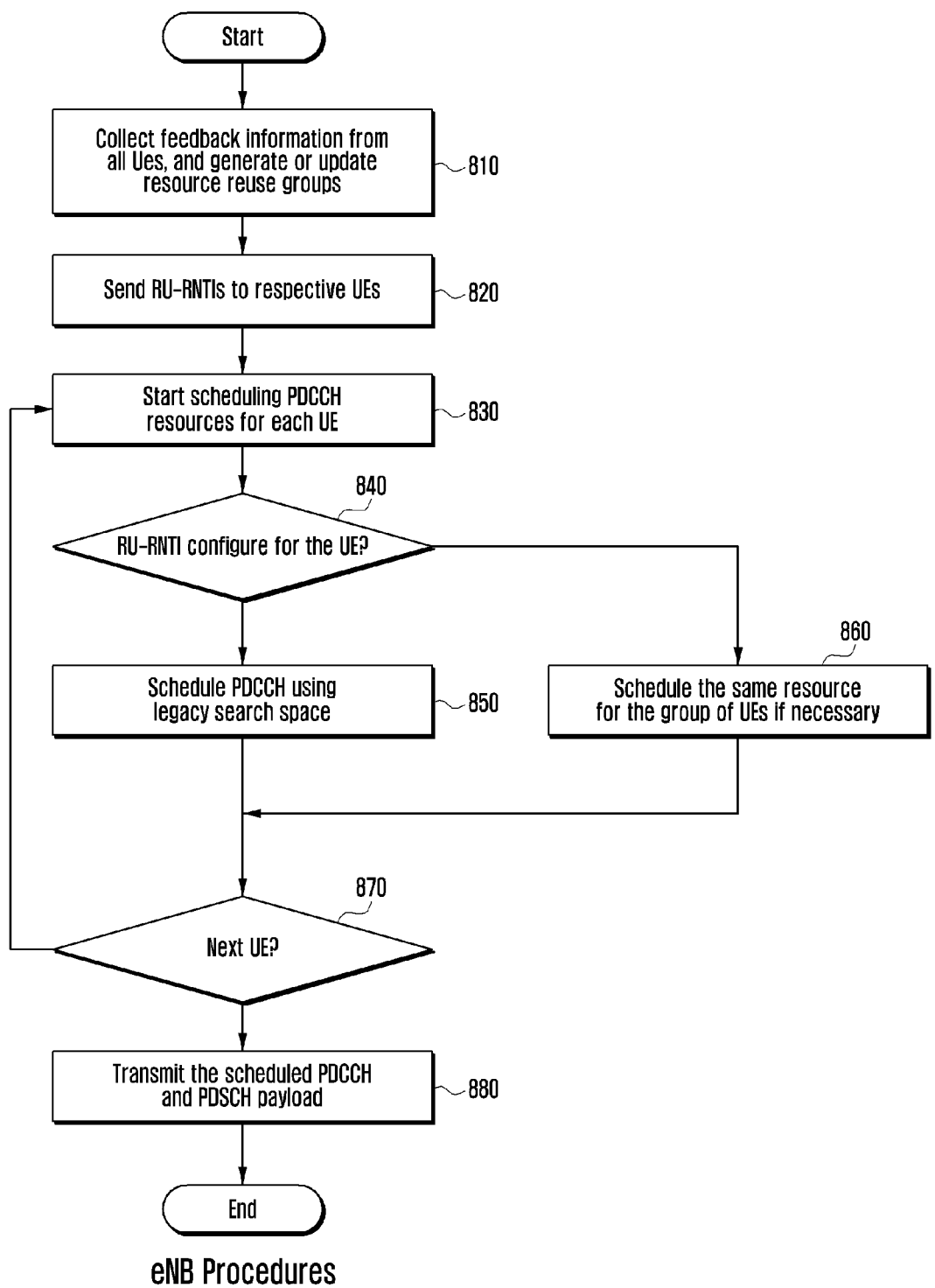
FIG. 8 illustrates a working procedure for a Radio Unit-Radio Network Temporary Identifiers (RU-RNTI)-based search space generation and PDCCH transmission at an eNB, according to the present invention.
Figure 9:
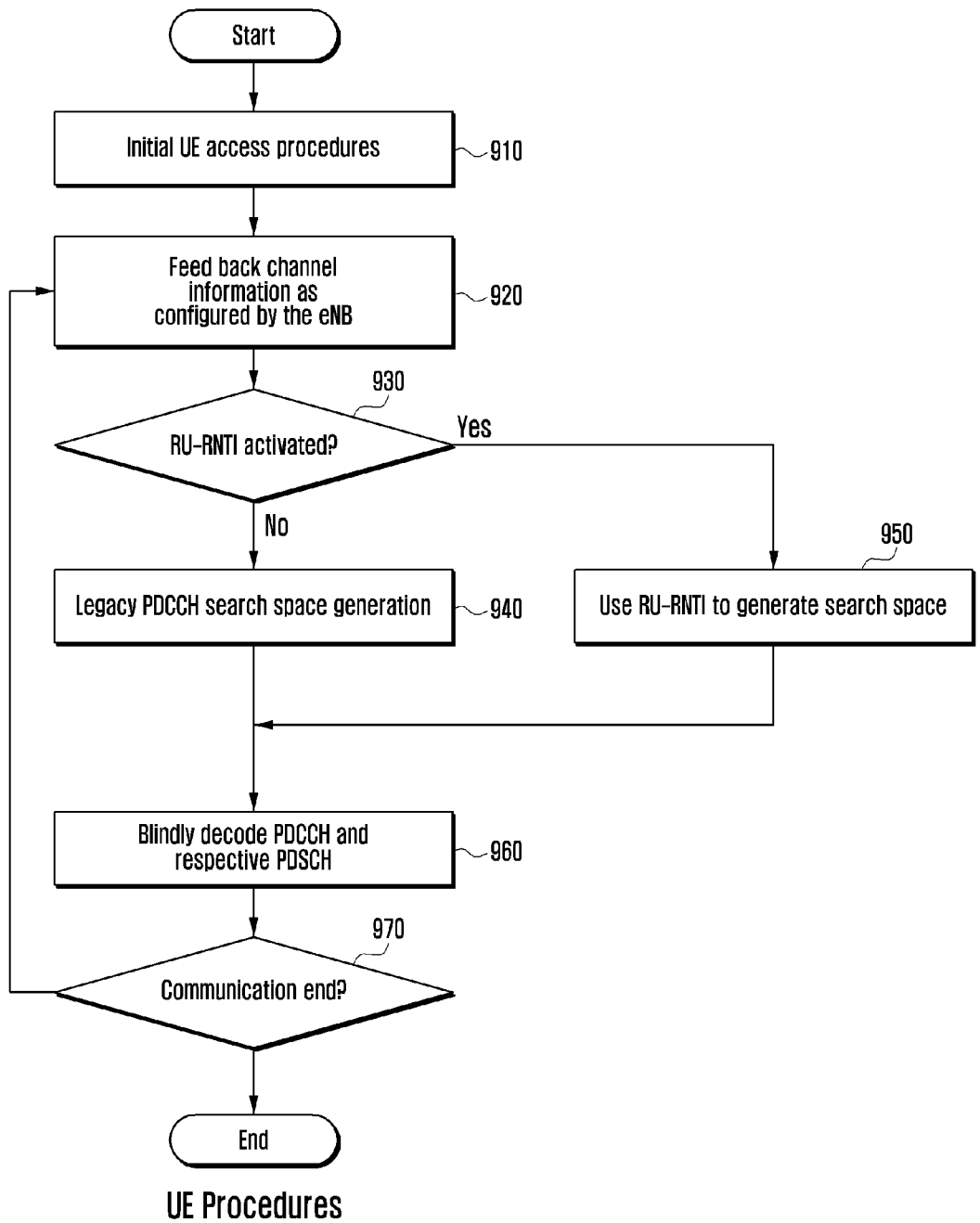
FIG. 9 illustrates a working procedure for an RU-RNTI-based search space generation and PDCCH transmission at a UE, according to the present invention.

The procedures of new search space configurations are illustrated in FIG. 8 and FIG. 9, according to the present invention.

FIG. 8 illustrates a working procedure for RU-RNTI-based search space generation and PDCCH transmission at an eNB. At step 810, the controller configures feedback modes for accessing a UE that is capable of RRH measurements. The controller will group UEs when a serving RRH will not cause significant interference to another UE.

Then, at step 820, the controller may configure two or more UEs in the group with an identical RU-RNTI, and send the configuration to respective UEs via RRC signaling. Then the controller starts scheduling PDCCH resource for each UE.

At step 840, the controller determines whether RU-RNTI is configured for the UE. If RU-RNTI is not configured, the controller proceeds to step 850 and schedules a PDCCH using legacy search space. If RU-RNTI is configured, the controller proceeds to step 860 and schedules PDCCH DCI formats for UEs with the same RU-RNTI using the same REG/CCE resources.

At step 870, the controller determines whether a next UE exists. If there is no UE, the process returns to step 830. If there is a next UE, the controller proceeds to step 880 and transmits the scheduled PDCCH and PDSCH payload.

The eNB may re-configure the RU-RNTI for the UE when the grouping is changed; optionally, the eNB may also deactivate the configured RU-RNTI for a UE. The deactivation can be another explicit RRC signaling, or may involve reusing the RU-RNTI configuration signaling by sending a predefined RU-RNTI sequence, e.g., an all-zero binary sequence. When the RU-RNTI is deactivated, the UE will fall back to use legacy RNTIs for search space generation.

FIG. 9 illustrates a working procedure for RU-RNTI-based search space generation and PDCCH transmission at a UE, according to the present invention.

At step 910, the controller performs initial UE access procedures. At step 920, the controller feeds back the channel conditions including links with all RRHs.

At step 930, the controller determines whether the RU-RNTI is activated. If the RU-RNTI is not activated, the controller proceeds to step 940 and generates search space with legacy PDCCH. If RU-RNTI is activated, the controller proceeds to step 950 and uses the RU-RNTI value to generate the search spaces. UEs with the same RU-RNTI will have the same search space.

At step 960, the controller decodes the PDCCH and a respective PDSCH. The controller proceeds to step 970 and determines whether communication has ended. If communication has not ended, the controller returns to step 920. If communication has ended, the controller ends the procedure.

Figure 10:
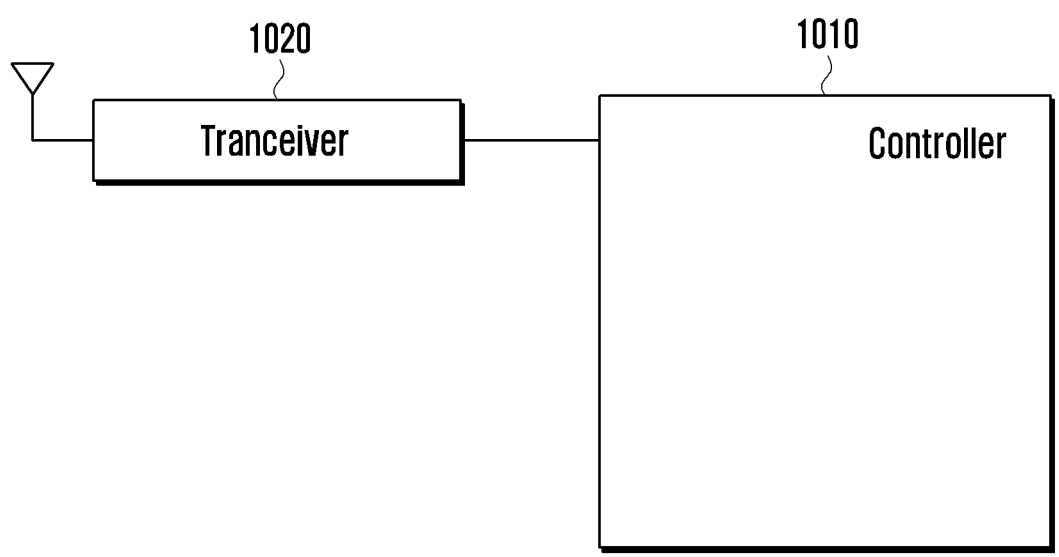
FIG. 10 illustrates an apparatus for user-specific reference signaling allocation of a control channel at a eNB, according to the present invention.

FIG. 10 illustrates an apparatus for user-specific reference signaling allocation of a control channel at an eNB, according to the present invention.

The apparatus for user-specific reference signaling allocation of control channel at an eNB comprises a transceiver 1020 and a controller 1010.

The transceiver 1020 transmits and receives data and the controller 1010 controls receiving channel information, determining whether to transmit a PDCCH including a user-specific reference signal based on the channel information, allocating, if a transmission of PDCCH including user-specific reference signal is determined, the user-specific reference signal to a resource element, wherein the resource element is predefined according to UE information, and transmitting the PDCCH including user-specific reference signal.

The controller 1010 can control determining whether to transmit a PDCCH including a user-specific reference signal based on improvement of the PDCCH performance and the size of a DCI format.

Figure 11:
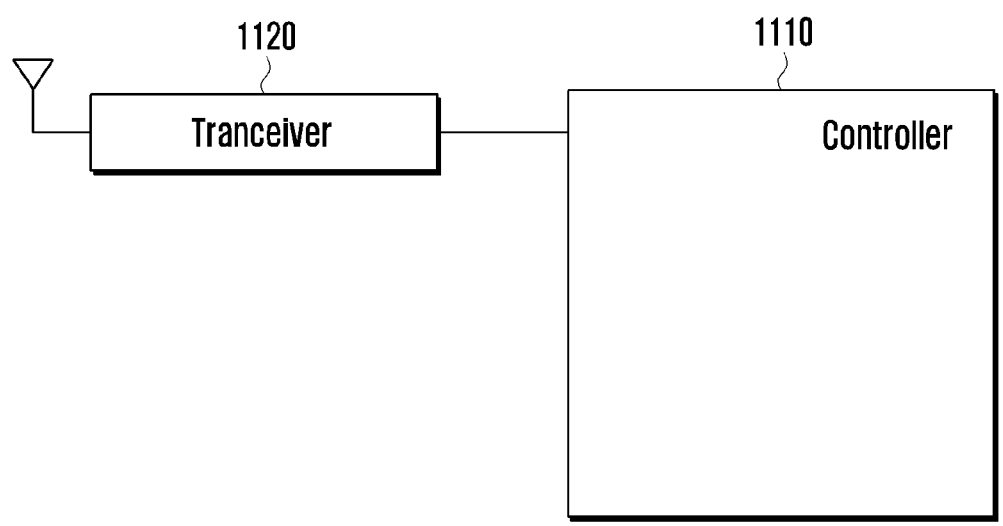
FIG. 11 illustrates an apparatus for user-specific reference signaling allocation of a control channel at a UE.

FIG. 11 illustrates an apparatus for user-specific reference signaling allocation of control channel at a UE, according to the present invention.

The apparatus for user-specific reference signaling allocation of control channel at a UE comprises a transceiver 1120 and a controller 1110.

The transceiver transmits and receives data and the controller controls receiving a PDCCH, determining whether the PDCCH includes a user-specific reference signal, and decoding, if the PDCCH includes a user-specific reference signal, a resource element including the user-specific reference signal, wherein the resource element is predefined according to UE information.

The controller controls receiving a Physical Download Shared Channel (PDSCH) respective to the PDCCH including user-specific reference signal.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for transmitting a control channel at an Evolved Node B (eNB), the method comprising:
   determining whether a Physical Downlink Control CHannel (PDCCH) is associated with a user-specific reference signal;
   configuring the PDCCH associated with the user-specific reference signal based on the determination;
   allocating the user-specific reference signal to a resource element, wherein the resource element corresponds to User Equipment (UE) information; and
   transmitting the PDCCH associated with the user-specific reference signal,
   wherein the user-specific reference signal is allocated to the resource element if transmission of the PDCCH is associated with the user-specific reference signal, and
   wherein the PDCCH associated with the user specific reference signal is transmitted in a legacy PDCCH region.

2. The method of claim 1, wherein the UE information is a UE Identification (ID) and the resource element is predefined by a function of the UE ID.

3. The method of claim 2, wherein the function of the UE ID is determined by:

$$I_{RS} = \text{UE ID mod } 4, \quad I_{RS} = 0\text{-}3,$$

wherein $I_{RS}$ is a reference signal position index.

4. The method of claim 1, wherein configuring the PDCCH associated with the user-specific reference signal is based on improvement of the PDCCH performance and a size of a Downlink Control Information (DCI) format.

5. The method of claim 1, wherein the resource element is a sub-carrier in an Orthogonal Frequency Division Multiplexing (OFDM) symbol.

6. A method for receiving a control channel at a User Equipment (UE), the method comprising:
   determining whether a Physical Downlink Control CHannel (PDCCH) is associated with a user-specific reference signal;

receiving the PDCCH associated with the user-specific reference signal based on the determination;

decoding the PDCCH based on the user-specific reference signal; and decoding a Physical Downlink Shared CHannel (PDSCH) associated with the PDCCH, wherein the user-specific reference signal is transmitted on a resource element corresponding to UE information and the decoding is performed if the PDCCH is associated with the user-specific reference signal, and wherein the PDCCH associated with the user specific reference signal is received in a legacy PDCCH region.

7. The method of claim 6, wherein the UE information is a UE Identification (ID) and the resource element is predefined by a function of the UE ID.

8. The method of claim 7, wherein the function of the UE ID is determined by:

$$I_{RS} = \text{UE ID} \bmod 4, I_{RS} = 0\text{-}3,$$

wherein $I_{RS}$ is a reference signal position index.

9. The method of claim 6, further comprising:

receiving the PDSCH respective to the PDCCH associated with the user-specific reference signal.

10. The method of claim 6, wherein the resource element is a sub-carrier in an Orthogonal Frequency Division Multiplexing (OFDM) symbol.

11. An apparatus for transmitting a control channel at an Evolved Node B (eNB), the apparatus comprising:

a transceiver configured to transmit and receive data; and a controller configured to control determining whether a Physical Downlink Control CHannel (PDCCH) is associated with a user-specific reference signal, configuring the PDCCH associated with the user-specific reference signal based on the determination, allocating the user-specific reference signal to a resource element, wherein the resource element corresponds to User Equipment (UE) information, and transmitting the PDCCH associated with the user-specific reference signal, wherein the user-specific reference signal is allocated to the resource element if transmission of the PDCCH is associated with the user-specific reference signal, and wherein the PDCCH associated with the user specific reference signal is transmitted in a legacy PDCCH region.

12. The apparatus of claim 11, wherein the UE information is a UE IDentification (ID) and the resource element is predefined by a function of the UE ID.

13. The apparatus of claim 12, wherein the function of the UE ID is determined by:

$$I_{RS} = \text{UE ID} \bmod 4, I_{RS} = 0\text{-}3,$$

wherein $I_{RS}$ is a reference signal position index.

14. The apparatus of claim 11, wherein configuring the PDCCH associated with the user-specific reference signal is based on improvement of the PDCCH performance and a size of a Downlink Control Information (DCI) format.

15. The apparatus of claim 11, wherein the resource element is a sub-carrier in an Orthogonal Frequency Division Multiplexing (OFDM) symbol.

16. An apparatus for receiving a control channel at a User Equipment (UE), the apparatus comprising:

a transceiver configured to transmit and receive data; and a controller configured to control:

determining whether a Physical Downlink Control CHannel (PDCCH) is associated with a user-specific reference signal, identifying, for signal reception, the received PDCCH associated with the user-specific reference signal, decoding the PDCCH signal based on the user-specific reference signal; and decoding a Physical Downlink Shared CHannel (PDSCH) associated with the PDCCH, wherein the user-specific reference signal is transmitted on a resource element corresponding to UE information and the decoding is performed if the PDCCH is associated with the user-specific reference signal, and wherein the PDCCH associated with the user specific reference signal is received in a legacy PDCCH region.

17. The apparatus of claim 16, wherein the UE information is a UE IDentification (ID) and the resource element is predefined by a function of the UE ID.

18. The apparatus of claim 17, wherein the function of the UE ID is determined by:

$$I_{RS} = \text{UE ID} \bmod 4, I_{RS} = 0\text{-}3,$$

wherein $I_{RS}$ is a reference signal position index.

19. The apparatus of claim 16, wherein the controller controls receiving the PDSCH respective to the PDCCH associated with the user-specific reference signal.

20. The apparatus of claim 16, wherein the resource element is a sub-carrier in an Orthogonal Frequency Division Multiplexing (OFDM) symbol.

* * * * *